United States Patent Office 3,208,948
Patented Sept. 28, 1965

3,208,948
VANADIUM-CONTAINING FERRIMAGNETIC MATERIAL
George Blasse, Emmasingel, Eindhoven, Netherlands, assignor to North American Philips Company, Inc., New York, N.Y., a corporation of Delaware
No Drawing. Filed Aug. 31, 1962, Ser. No. 220,899
Claims priority, application Netherlands, Sept. 8, 1961, 269,072
6 Claims. (Cl. 252—62.5)

The invention relates to vanadium-containing, ferrimagnetic materials and vanadium-containing, ferrimagnetic bodies and to methods of producing these materials and bodies.

Vanadium-containing ferrimagnetic ferrites are already known for various uses, for example, as core material in high-frequency coils and as magnetostrictive materials in piezomagnetic oscillators or transducers.

The invention provides a new class of ferrimagnetic oxidic vanadium-containing materials, i.e., those having a composition in accordance with the formula:

$$NiFe_{2-x}V_xO_4$$

wherein $0.85 \leq x \leq 1.25$. Bodies made from these materials are excellently suitable for use at microwave frequencies, for example in transmission elements in directional insulators passing microwaves in one direction.

The materials according to the invention are distinguished by an extremely low temperature coefficient of the saturation magnetization in a wide temperature range on either side of room temperature. This applies particularly to those materials which have a composition in which in the formula given above $0.99 \leq x \leq 1.01$, as will be seen from the following table, which refers to such materials.

Table

| Saturation magnetization (in Gauss, cm.$^3 \cdot$g$^{-1}$): | Temperature (in degrees centigrade) |
|---|---|
| 17.4 | −175 |
| 17.4⁵ | −150 |
| 17.5⁵ | −135 |
| 17.6 | −120 |
| 17.8⁵ | −90 |
| 17.9 | −75 |
| 17.9 | −50 |
| 17.8⁵ | −30 |
| 17.8 | −5 |
| 17.7 | +20 |
| 17.5 | +80 |
| 17.3 | +120 |
| 16.2 | +190 |
| 13.3 | +250 |

The strength of the magnetic field used in measuring the saturation magnetization was 21,000 oersteds. The Curie point of the tested substance is at 335° C.

The production of a ferrimagnetic material or body according to the invention may be performed as follows.

Iron oxide $Fe_2O_3$, nickel oxide NiO, and vanadium trioxide $V_2O_3$ in a molecular ration of 1:2:1 are ground, with ethanol as a grinding liquid, in a nitrogen atmosphere. Then the mixture is dried and molded in the desired shape, also in a nitrogen atmosphere. The pressed body is then heated in an exhausted quartz tube at a temperature between 800° C. and 1200° C., preferably between 950° C. and 1050° C. for a long time, preferably for 10 to 20 hours. If desired, the cooled reaction product is again ground, moulded in a form and subjected to a thermal treatment as described above.

The materials according to the invention, like most known ferrimagnetic ferrites, exhibit spinel crystal structure.

What is claimed is:
1. A ferrimagnetic material consisting essentially of a composition corresponding to the formula:

$$NiFe_{(2-x)}V_xO_4$$

where $x$ is between 0.85 and 1.25.

2. A ferrimagnetic material consisting essentially of a composition corresponding to the formula:

$$NiFe_{(2-x)}V_xO_4$$

where $x$ is between 0.99 and 1.01.

3. A method of manufacturing a ferrimagnetic material comprising the steps, forming a finely-divided mixture of $Fe_2O_3$, NiO and $V_2O_3$ in a molecular ratio of $$(2-x):2:x, x$$

having a value between 0.85 and 1.25, and heating said mixture in a vacuum at a temperature between 800° C. and 1200° C.

4. A method of manufacturing a ferrimagnetic material as defined in claim 3 in which $x$ has a value between 0.99 and 1.01.

5. A method of manufacturing a ferrimagnetic material as defined in claim 3 in which the mixture is heated at a temperature between 950° C. and 1050° C. for about 10 to 20 hours.

6. A method of manufacturing a ferrimagnetic material as defined in claim 5 in which the heated mixture is finely-divided and heated again to a temperature between 950° and 1050° C. in a vacuum for 10 to 20 hours.

References Cited by the Examiner
UNITED STATES PATENTS
2,744,873   5/55   Piekarski _____ 252—62.5

FOREIGN PATENTS
830,208   3/60   Great Britain.

MAURICE A. BRINDISI, *Primary Examiner.*